a constant US012335326B2

(12) United States Patent
Rajendran et al.

(10) Patent No.: US 12,335,326 B2
(45) Date of Patent: Jun. 17, 2025

(54) STIMULUS-BASED COLLABORATIVE FUNCTIONS FOR COMMUNICATION SYSTEMS

(71) Applicant: Mitel Networks Corporation, Ottawa (CA)

(72) Inventors: Boopalan Rajendran, Bangalore (IN); Logendra Naidoo, Ottawa (CA)

(73) Assignee: Mitel Networks Corporation, Ottawa (CA)

( * ) Notice: Subject to any disclaimer, the term of this patent is extended or adjusted under 35 U.S.C. 154(b) by 0 days.

(21) Appl. No.: 17/318,618

(22) Filed: May 12, 2021

(65) Prior Publication Data

US 2022/0368745 A1 Nov. 17, 2022

(51) Int. Cl.
| | | |
|---|---|---|
| *H04L 29/06* | (2006.01) | |
| *G06F 16/334* | (2025.01) | |
| *H04L 65/1083* | (2022.01) | |
| *H04L 65/1096* | (2022.01) | |
| *H04L 65/403* | (2022.01) | |
| *H04L 65/75* | (2022.01) | |

(52) U.S. Cl.
CPC .......... *H04L 65/75* (2022.05); *G06F 16/3344* (2019.01); *H04L 65/1083* (2013.01); *H04L 65/1096* (2013.01); *H04L 65/403* (2013.01)

(58) Field of Classification Search
CPC ............... H04L 65/601; H04L 65/1096; H04L 65/1083; H04L 65/403; G06F 16/3344
See application file for complete search history.

(56) References Cited

U.S. PATENT DOCUMENTS

| | | | |
|---|---|---|---|
| 7,299,405 B1 | 11/2007 | Lee et al. | |
| 7,734,802 B1 * | 6/2010 | Gay | G06F 3/0481 |
| | | | 715/732 |
| 8,091,029 B1 | 1/2012 | Gay et al. | |
| 9,824,335 B1 * | 11/2017 | Vander Mey | G06Q 10/103 |
| 10,372,315 B2 * | 8/2019 | Jones | G06F 3/0486 |
| 2003/0204490 A1 * | 10/2003 | Kasriel | G06F 40/169 |
| 2012/0011205 A1 * | 1/2012 | Paulsami | G06Q 10/1095 |
| | | | 709/204 |
| 2013/0086487 A1 * | 4/2013 | Findlay | G06F 40/169 |
| | | | 715/753 |

(Continued)

*Primary Examiner* — Shean Tokuta
*Assistant Examiner* — Juan C Turriate Gastulo (57) ABSTRACT

A communication system with enhanced collaboration functionality. During operations of the new communication system, users (e.g., online meeting, conference, call, or presentation attendees or participants operating a client device in communication via a communications network) join a collaboration session via their preferred collaboration application. One of the attendees wants to get their document or other content seen, so they share their screen and start to present their content. With the new communication system, an attendee chooses to initiate a collaboration option (e.g., clicking a button in a user interface such as "Create a conference call" button), while identifying or highlighting a subset or portion of the presented content as relevant to the new collaboration event. Attendees are added to an ad hoc conference meeting (or other new or spawned collaboration event), and the content that is originally asserted as the topic of conversation is displayed in the conferencing apparatus.

20 Claims, 9 Drawing Sheets

(56) References Cited

U.S. PATENT DOCUMENTS

| | | | |
|---|---|---|---|
| 2013/0117672 A1* | 5/2013 | Coates | G06Q 10/109 |
| | | | 715/730 |
| 2013/0151624 A1* | 6/2013 | Bhogal | G06Q 10/103 |
| | | | 709/205 |
| 2014/0082090 A1* | 3/2014 | Wodzinski | G06Q 10/109 |
| | | | 709/205 |
| 2014/0281870 A1* | 9/2014 | Vogel | G06F 40/18 |
| | | | 715/220 |
| 2017/0310716 A1 | 10/2017 | Venegas et al. | |
| 2018/0123814 A1* | 5/2018 | Sexauer | H04L 51/04 |
| 2019/0180739 A1 | 6/2019 | Raja et al. | |
| 2020/0106813 A1* | 4/2020 | Vendrow | G06F 16/48 |
| 2020/0403817 A1* | 12/2020 | Daredia | G10L 15/083 |
| 2021/0051185 A1* | 2/2021 | Caston | G06Q 10/103 |
| 2022/0261760 A1* | 8/2022 | Cupala | G06Q 10/1095 |

* cited by examiner

STIMULUS-BASED COLLABORATIVE FUNCTIONS FOR COMMUNICATION SYSTEMS

FIELD OF THE INVENTION

The present disclosure generally relates to electronic communication methods and systems with collaborative tools to facilitate collaboration among users of such electronic communication methods and systems. More particularly, examples of the disclosure relate to electronic communication methods and systems that provide stimulus-based collaboration or collaborative functions or tools.

BACKGROUND OF THE DISCLOSURE

Every business can benefit from great teamwork, and it is widely recognized that electronic communications (e.g., video conferencing, whiteboarding events, office chat tools, e-mails and text messaging, and the like) and collaboration are key to teams achieving desired results. This is especially true for teams in which one-to-many may be remote from each other. However, excellent collaboration requires excellent communications among a team combined with collaboration-facilitating tools or system functions, and the quality of that communication is far more valuable than the quantity. Unfortunately, to date, the existing collaboration tools have not been wholly effective in their implementation or use, and team collaboration often goes poorly.

Many kinds of conventions exist to initiate a collaboration event or session, but no existing tools provide an effective and convenient way to collaborate on-demand for specific aspects of content during a presentation or collaboration event. Existing-content-dependent solutions include web media sharing (e.g., "Share to Facebook," "Search with Google" and the like). Alternatively, users of a collaboration application or tool may be able to highlight a phone number and create a hyperlink to start a call. In some collaboration applications, users can call meetings (e.g., "Add to Calendar" or similar collaboration functions). While these tools facilitate aspects of collaboration, they do not provide the capability to activate a collaboration event based on the presented content and do not allow users to apply or provide dynamic content to extend the active or ongoing collaboration and/or communication session and its content to achieve enhanced collaboration among the team (session attendees) or tool users.

Any discussion of problems provided in this section has been included in this disclosure solely for the purposes of providing a background for the present invention and should not be taken as an admission that any or all of the discussion was known at the time the invention was made.

BRIEF DESCRIPTION OF THE DRAWING FIGURES

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements and wherein:

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION OF EXEMPLARY EMBODIMENTS

The description of exemplary embodiments of the present invention provided below is merely exemplary and is intended for purposes of illustration only; the following description is not intended to limit the scope of the invention disclosed herein. Moreover, recitation of multiple embodiments having stated features is not intended to exclude other embodiments having additional features or other embodiments incorporating different combinations of the stated features.

As set forth in more detail below, exemplary embodiments of the disclosure relate to electronic communication systems, and corresponding methods performed by such systems, that can, for example, provide stimulus-based collaborative functions or tools The new systems are configured to provide users with the capability to activate a collaboration event based on the presented content of the ongoing collaboration event or session, often while the presentation is still underway. The new system also facilitates the application by users (collaboration event attendees or participants) of virtual notes (or dynamic content) to a collaboration session that is underway, i.e., during a video conferencing presentation or the like. In brief, the communication systems of the present description have the embedded capability to highlight content and then spawn additional collaboration events in a manner that supports the ongoing (or underway) collaboration event or session.

The inventors recognized that collaboration tools (prior to their communication system with its collaboration tools/functions) do not provide an effective and convenient way to collaborate on demand for specific aspects of the presented content during a presentation or collaboration session/event.

If during a presentation a user or participant wants to discuss a presented topic that is subordinate to the presented primary content, it is challenging to sponsor such a meeting so that it is spawned or initiated as a result of the presented content.

A meeting attendee can easily call a meeting about something they observed during the main presentation and then manually direct the new target audience (or members of the original meeting) to the specific content that is the topic of interest. However, in previous collaboration applications, there was no technique or functionality to create a collaboration event or session that is based solely on what is presented during the conference session or event. Simply viewing static content presented on a screen used to access an online or cloud-based collaboration event is informative. The inventors understood, though, that attendees in collaborative meetings or sessions learn things during the meetings that may result in other opportunities to boost their productivity or the productivity of others that they team or work with. For example, a collaboration or presentation attendee may think to themselves the following: "I was at the Project X testing meeting, and I identified problems with their scheduled rollout. I'll call a meeting with stakeholders after I get a copy of the presentation. I made some notes during the meeting, and I hope I recorded rollout schedule dates correctly for use in the next meeting."

Other existing collaboration tools allow a user to provide online "sticky notes," but the inventors recognized these are intended for brainstorming-type sessions outside of the main presentation. Hence, these tools fail to emphasize the application of virtual notes to a collaboration session that is underway or during the presentation and, as a result, fail to suggest a method to isolate the relevant vicinity of the presented content to be discussed in a spawned collaboration event or linking dynamic content to the content in the relevant vicinity (e.g., content in a presently displayed set of content that is within a predefined vicinity of a pointer/cursor (that may be placed by a touchscreen interaction, a mouse movement, and so on)) as provided by the new systems described herein.

Further, the inventors recognized that a voice call with another user (or conference call with multiple users) might also present itself as a key opportunity to collaborate with the impetus of the voice call (or other communication event) resulted from the presentation itself. With present collaboration tools, though, the user would simply pick up their phone to initiate the voice call, but, unfortunately, the context of what needs to be talked about can readily be lost or inaccurately remembered by the call participants. Also, with existing collaboration applications, a user may manually sponsor a new meeting to continue or expand upon a collaboration session they are attending and invite the relevant stakeholders, capture the relevant content, present the relevant content they captured in the next meeting, and so on. Typically, this ritual involves sending a screen-captured image file (with or without annotations they add after recordation or capture) as an attachment for the new meeting. This approach is inconvenient and not widely used because it detracts from the instantaneous need to call a meeting based on the perceived purpose and because it requires effort and time from the user (e.g., users/attendees often complain: "Who has time to screen capture a portion of a meeting presentation while they are trying to participate in a session, then call a meeting, start a chat session, or make a voice call? This approach is just too clunky.").

In creating the electronic communication (or computer) systems that implement the new collaboration methods and tools, the inventors recognized that a communication system can be configured with one or more components or modules (e.g., software-based tools or applications) running on a collaboration client, on a streaming server, and a collaboration server along with data storage of collaboration content to provide the new collaboration tools or functions. To describe these system components/modules and their functional designs, it may be useful to first provide a brief functional overview of a communication system operating to provide stimulus-based collaboration. This description will be followed first by an explanation of differences between the proposed collaboration techniques and prior approaches and second by a more detailed description of implementations of communication systems and methods with collaboration tools created by the inventors.

During operations of the new communication system, users (e.g., online meeting, conference, call, or presentation attendees or participants operating a client device in communication via a communications network) join a meeting (e.g., any collaboration session) via their preferred collaboration application. One of the attendees wants to get their document or other content seen, so they share their screen and start to present their content (provide "presented content" of the ongoing or "live" collaboration session). Other attendees may want to have some additional discussion regarding what is being presented online, perhaps not interrupting the meeting that is underway.

With the new communication system, the attendee chooses to initiate collaboration option (e.g., clicking a button in a displayed graphical user interface (GUI) such as "Create a conference call" button), while identifying or highlighting (e.g., by right-clicking with their mouse or touching a point on their touchscreen displaying the content) a subset or portion of the presented content as relevant to the new collaboration event (or supplemental collaboration session). Attendees are added to an ad hoc conference meeting (or other new or spawned collaboration event), and the content that is originally asserted (e.g., by being in a vicinity of the identified/highlighted point in the presented content on the monitor/display of the user's client device).as the topic of conversation is displayed in the conferencing apparatus (or otherwise provided to the attendees via their particular client device).

The new collaboration method allows the user to create any collaboration opportunity (such as with the above conference call implementation example) by activating the collaboration apparatus/tool and also by eliciting important context from the presented media of the original or parent collaboration session. Context, in addition to identified content (or new topic), can be derived by the system using a Natural Language Processing (NLP) module (such as in the stream analyzer and/or in the collaboration data analyzer) and creating metadata elements such as "Meeting Purpose," keywords, participants, and the like. In some implementations, the system may provide collaborative functions/tools that use this derived context to provide a thumbnail image (via a web search or the like) in the new collaboration event (e.g., in a chat session) or when pushing social media.

Collaborating over precise content is one of the emphasis of the new communication system (and its collaboration methods). While some prior collaboration tools allow users to draw or place annotations on their content, the new method, instead, creates opportunities to collaborate based on the identified or selected content itself. Content dependencies that are embedded in presentations can be leveraged by the new system to initiate collaboration functions (or new events) including the following: (a) initiate a voice call; (b)

initiate a chat session; (c) create a calendar booking for a new collaboration event; (d) create a virtual note (e.g., a sticky note); (f) initiate a whiteboard session; and (e) create a social media post. While an online presentation can be modified by the application of virtual notes (during a live presentation or collaboration session), integrating, with the new communication system, collaboration functions based on live content provides greater utility. This allows users to communicate with other collaborators based on a relevant live premise or other presented content that they are free to select or identify via highlighting (e.g., right clicking their mouse with the cursor at a desired location in the presented content).

In contrast, prior collaboration tools focused mainly on brainstorming capabilities that do not on existing meetings in progress. For example, some collaborative tools exist that focus on collaborative whiteboarding but not the meshing of content in the ordinary course of presenting content. These and other tools focus on annotating content for view-only purposes. For example, some collaborative applications support virtual "sticky notes" using a whiteboard tool, but these prior applications fail to show adding such notes during presentations or collaboration session with displayed content let alone suggest spawning new events based on selected portions of the displayed content.

One exemplary use case is collaboration during a Microsoft PowerPoint® or similar slide-based presentation of digital content. Users log into the appropriate meeting application running upon their network-linked client or communication device. The presenter starts to share slide content to be reviewed. Collaborators see the presentation content via a display screen on their client device and recognized an ad hoc need or desire to verify (or merely discuss) what is being presented at a particular moment using input from other meeting participants or nonattendees (those not participating in the present collaboration session). The system starts to track content that was displayed using a combination of techniques such as auto-OCR, visual API (image identity), and so on. When the collaborator selects (by right-clicking their mouse with the cursor/pointer at a location in the displayed content on their display screen, by touching a location in the displayed content on a touchscreen version of the display screen, and the like) an image or text, the process running in the background in the communication system to identify the type of content recommends or determines the specific elements or portions of the displayed content for use in the collaboration subprocess (or the spawned/initiated collaboration event).

The new collaboration method may use simple NLP or other approaches to identify keywords (or other context) that can be used to facilitate the spawned collaboration event. For example, keywords identified in the portion of the content selected by the user (or by the system based on a pointer/cursor location in the displayed content) may be used to create a subject header. Alternatively or additionally, in the case of an image being the selected content, machine learning or another technique may be used to process and understand the image using prediction accuracy and/or other algorithms. The system may detect objects and faces in the image and can read printed and handwritten text. Then, if the collaborator chooses the option presented in a GUI in their client device to create a meeting/collaboration event, the meeting template can be populated with key metadata such as a meeting purpose, a subset of the determined keywords, and/or a suggested agenda for the new collaboration event. In some cases, the meeting purpose is sufficient along with a snapshot of the topical area (e.g., a subset of content from the originally-displayed content) to be discussed in the spawned meeting to significantly enhance collaboration results.

Figure 1A:
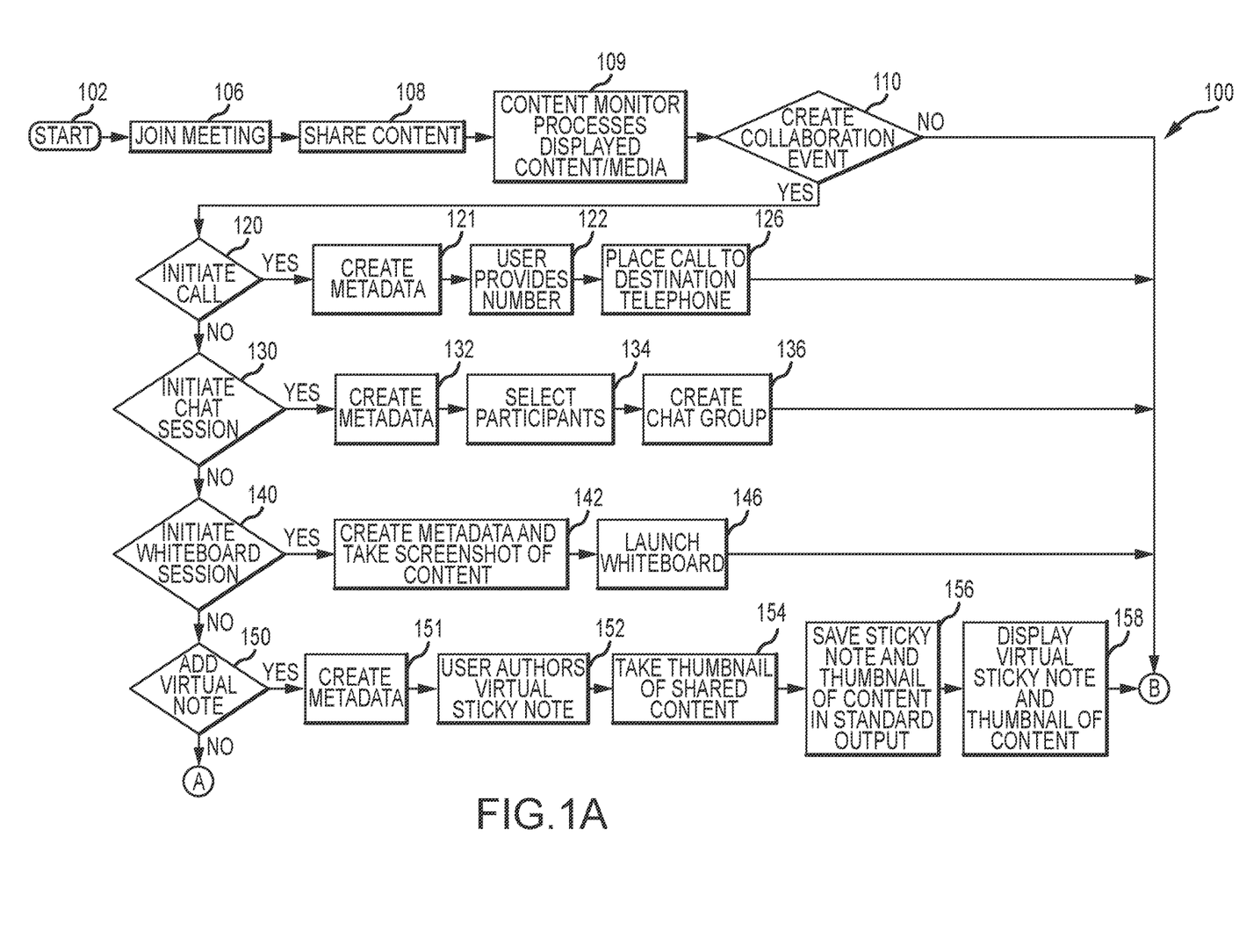
FIGS. 1A and 1B illustrate a stimulus-based collaboration method provided during operations of the electronic communication systems of the present description.
Figure 1B:
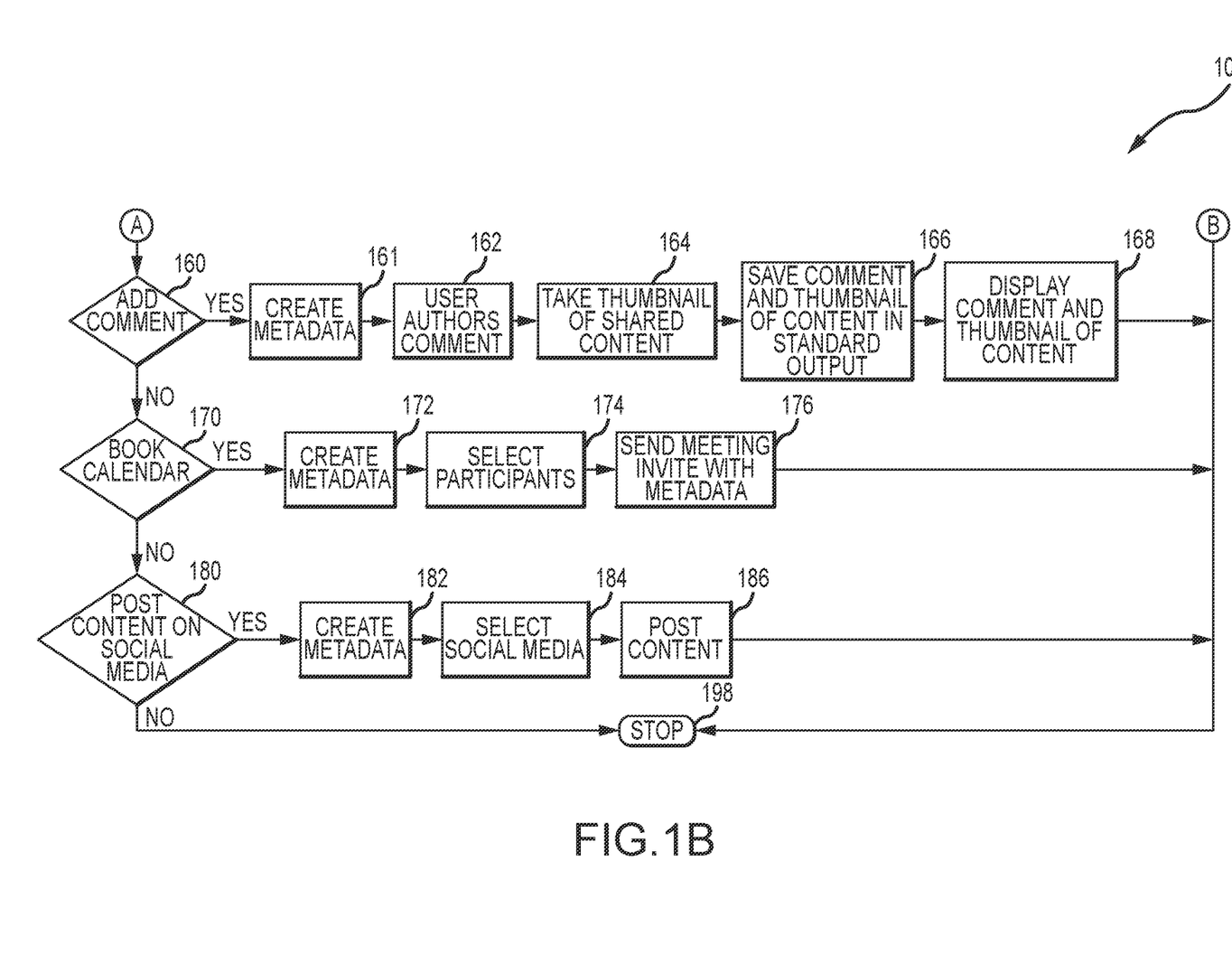

FIGS. 1A and 1B illustrate a stimulus-based collaboration method 100 provided during operations of the electronic communication systems of the present description. The method 100 starts at 102 such as with a user (or collaboration session participant, meeting attendee, or the like) operating their client device, which may take the form of nearly any computing or communication device with a processor, memory, a display with screen, and I/O components such as for wirelessly (or in a wired manner) communicatively linking with a digital communications network, to initiate a collaboration application with collaboration tools/functions as taught herein. This may require an initial downloading of an application on the client device to facilitate accessing a network or cloud based collaboration service. Then, at step 106, the method 100 continues with the user operating their client device to join a collaboration session (e.g., a Zoom meeting, a Microsoft Teams meeting, a Google Meet meeting, a Slack session, a Chanty chat session, or the like), which may involve the user entering a meeting code or selecting a link and/or taking other steps to log into the collaboration application and joining the collaboration session provided by the collaboration application.

Next, at step 108, a presenter (an attendee or participant of the session) begins to share content via the collaboration application. Typically, this step 108 will involve content (or media) being shared among the attendees, with each user's client device operating to display at least a portion of the shared content on their display screen or monitor (to provide "displayed content" or "presented content" or "presenter-shared content"). In step 109 (which may be performed concurrently with step 108), a content monitor (which may include a stream analyzer and a content data analyzer as called out in later system figures) simultaneously begins an analysis process of the shared and, typically, displayed content of the ongoing or live collaboration session. For example, the content monitor (a software suite or application running on the network providing the collaboration session) analyzes text and images of the shared content for image labeling, face and landmark detection, optical character recognition (OCR), tagging of explicit content using one or more tools presently available or to be developed (e.g., using Google Cloud Vision API, NLP algorithms, and the like). Metadata is generated in step 109 that is used, such as by a Collaboration on Demand (COD) engine. Also, in step 109, thumbnails may be created for use in a later initiated or spawned collaboration event or function.

Figure 2:
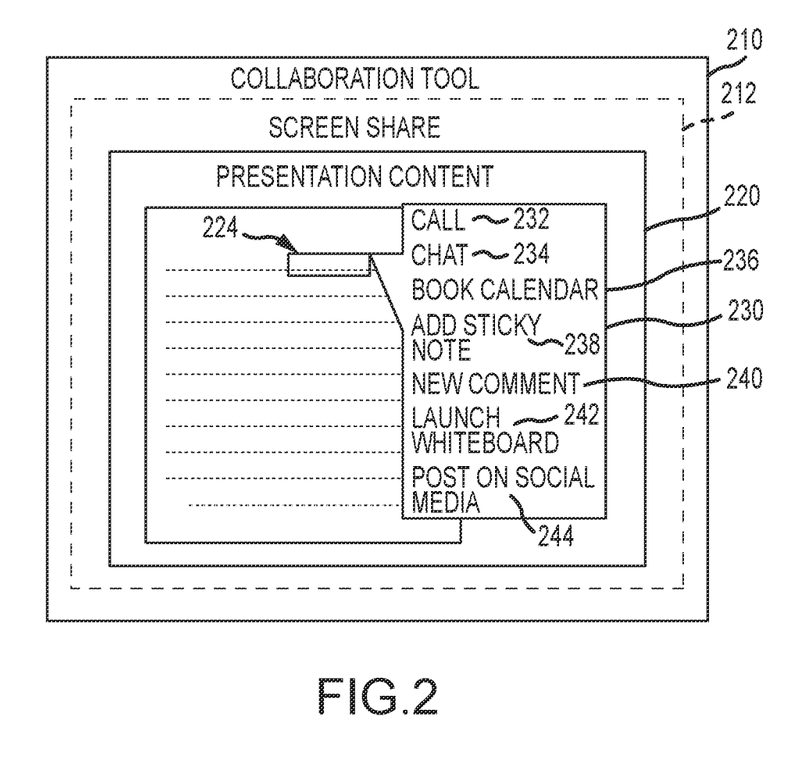
FIG. 2 illustrates an exemplary GUI that may be generated and displayed on a user's client device during a collaboration session of the present description.

The method 100 continues at step 110 with the COD engine (or a plugin in communication with the COD engine running on the user's client device) operating to monitor for user input indicating the user's desire to create a new collaboration event or function during the ongoing or live presentation/collaboration session. Significantly, the user interacts with the displayed content of the collaboration session to initiate a collaboration function. For example, a user may right click on a video feed while the presenter is talking about a particular topic. FIG. 2 illustrates a screen shot of collaboration GUI 210 created and displayed upon a display screen during operations of a user's client device to provide a collaboration session. As shown, a collaboration service or tool is operating to provide a GUI for a collaboration session. In this example, a presenter is using a screen share tool or service of the collaboration application/service to share their screen 212. Part of the shared screen includes presentation or displayed/shared content 220.

In the GUI 210, a user has operated their client device to interact with the content 220. This may be performed in a variety of ways such as operating I/O devices (such as a touchscreen, a mouse, or the like) to select a location or position of the content (e.g., moving a pointer or curser on the display screen) and right clicking or otherwise selecting that cursor/pointer location in the content 220 at that particular point in time in the collaboration session. The system may further encourage (e.g., with a popup box or the like) to isolate or highlight the content proximate to the selected point to select or identify a portion or subset 224 of the content 220 upon which the collaboration event or function to be spawned or initiated will apply. In some embodiments, the system (e.g., with its COD engine) will determine or automatically identify the subset or portion 224 of the displayed content 220 such as by choosing the displayed content 220 that is within a predefined space or area in the screen share about the location of the cursor/pointer at the time the user made their selection. In other cases, the system will use logic/algorithms to determine content 220 that is relevant to the content 220 at the pointer/cursor location at the time of user interaction with the presentation content 220.

As shown in FIG. 2, the system responds to the user's interaction with the presentation content 220 to show the isolated or highlighted (user-selected) subset or portion 224 of the content 224 and to also provide a popup box or bubble 230 that includes user-selectable buttons for reach of the user options for further collaboration (e.g., to provide a listing of all collaboration events or functions that the user can initiate using the collaboration system described herein). As shown with the buttons, the set of functions or events that can be triggered include a conference call 232, a chat session 234, a calendar booking (or book calendar event) 236, an add a virtual (or sticky) note 238, provide a new comment 240, launch a whiteboard session 242, and post on social media 244. When at step 110 a user selects content and then selects one of the event initiation options/buttons shown in FIG. 2, the collaboration event or function (or subprocess) is activated. Metadata generated in step 109 is added to the template, which may be used to provide a GUI for any initiated collaboration function or event, for each collaboration function or event. Also, keywords generated in step 109 are suggested to the attendees of the initiated event or function to enhance the meeting's purpose and to provide suggested topics for discussion. Also, a thumbnail (or image) of the selected portion 224 typically will be provided for display or use in the initiated collaboration event or function. If no further sessions are triggered at 110 or the collaboration session ends, the method 100 may stop/end at 198.

Figure 3:
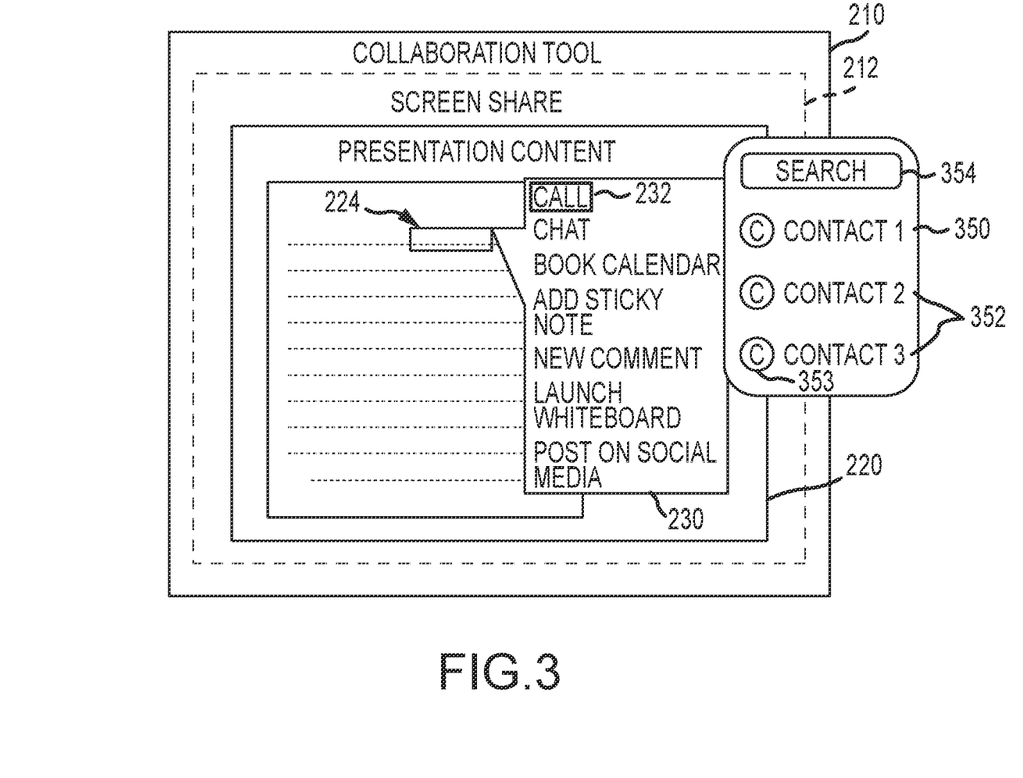
FIG. 3 illustrates the GUI of FIG. 2 with exemplary modifications after a user selection to initiate a call in response to displayed content of a collaboration session.

In the method 100 at step 110, the system may detect that a user wishes to initiate a call based on the content 224. The method 100 may initiate the call at step 120. FIG. 3 illustrates the GUI 210 of FIG. 2 with exemplary modifications by the new collaboration system after a user selection is received to initiate a call in response to displayed content 220 of a collaboration event. As shown, the user has selected the call button 232 in the collaboration initiation box/window 230 in their GUI 210. In response, the system may modify or update the displayed GUI 210 to provide a popup box/window 350 to initiate a supplemental collaboration event/function in the form of a call (to a single person or multiple people). The box/window 350 may include a listing of contacts/people that the system identifies (with the GUI 210 including an avatar, first characters of first or last name, or other contact identifier 353), based on a processing of the selected content 224 and/or collaboration data collected by the collaboration service/application, as being desirable for involvement in further collaboration on the selected content 224. Buttons/links 352 may be provided for the user to initiate the call directly during the ongoing collaboration session (e.g., for an offline call concurrently with the ongoing collaboration presentation/session). Also, a search box 354 may be provided to allow the user to search for other people to call regarding the content 224 that were not identified in the listing 352 (e.g., people who are not attending ("nonattendees") the currently ongoing collaboration session). As noted in FIG. 1A, the method 100 continues at 121 with creating metadata (e.g., sensible collaboration content) to provide to the user and/or participants of the call (e.g., in a GUI created for the call). Then, the user provides the number (e.g., selects a button 352 or enters a search value in box 354 and selects a number from provided results) at step 122, and the system places the call to the destination telephone at 126. In some embodiments, the method 100 accommodates a scenario in which the user does not need to provide a number when/if the person who is to be contacted is embedded within the image data from the presented content. This variation in the method 100 also applies to initiating a chat session (see step 134 discussed below).

In the method 100 at step 110, the system may detect that a user wishes to initiate a chat session based on the content 224. The method 100 may initiate the chat at step 130. In this case, the user will select data 224 and then select the chat button 234 shown in GUI 210. The method 100 will move from step 110 to step 130 and initiate the chat session 130. The method 100 continues at 132 with creating metadata to provide to the user and/or participants of the chat session (e.g., in a GUI created for the chat session). At step 134, the system acts to select participants for the chat session, and these may be provided for selection and/or editing to the user initiating the chat session ("initiated collaboration event or function"). Then at step 136, the collaboration system functions to create a chat group using the participants from step 134, the metadata from step 132, and the selected content 224 (e.g., which may be provided as a thumbnail in the GUI for the chat session). All these steps may occur during the presentation/session (and steps 108 and 109 of method 100).

Figure 4:
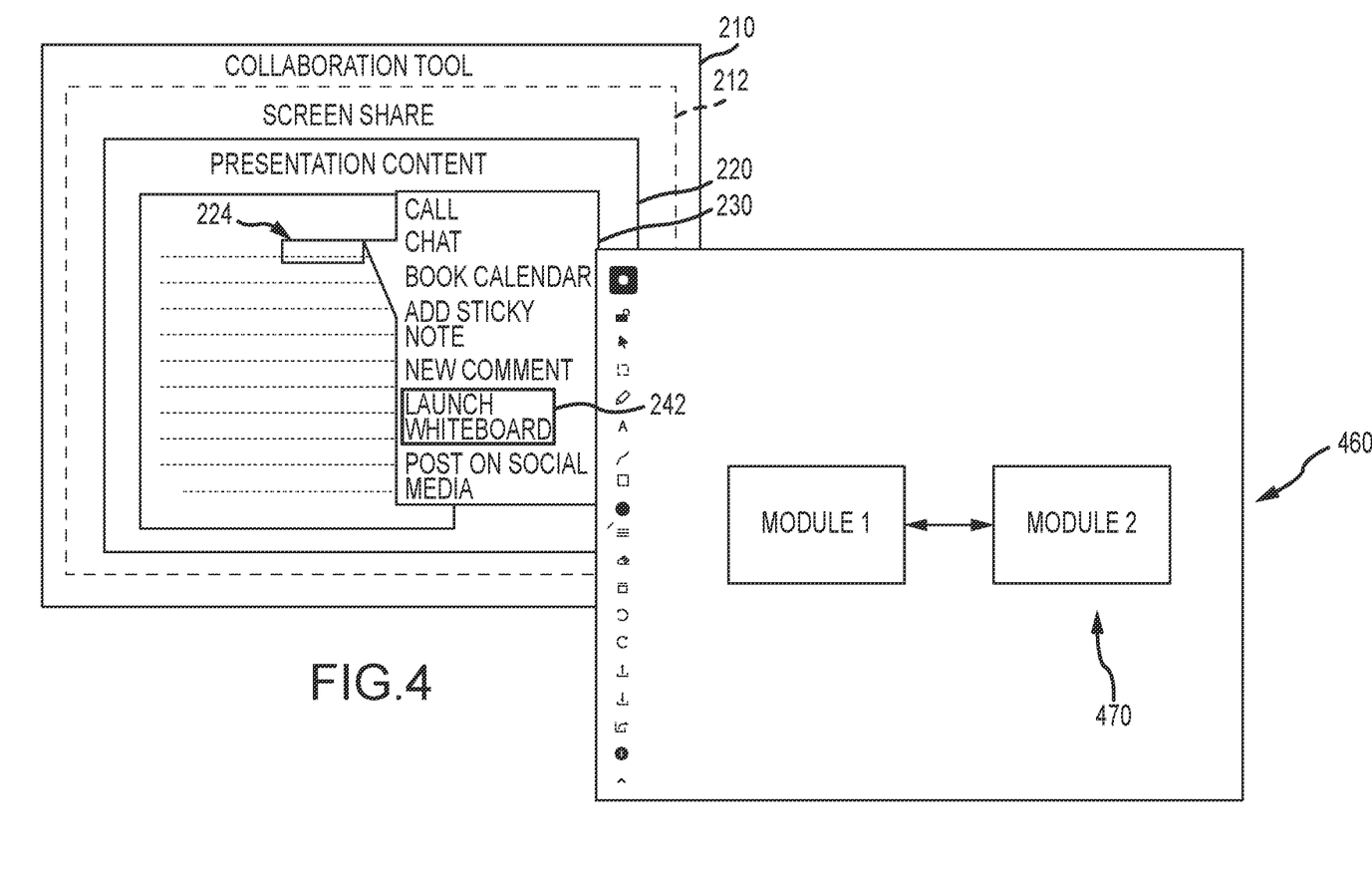
FIG. 4 illustrates the GUI of FIG. 2 with exemplary modifications after a user selection to initiate a whiteboard session in response to displayed content of a collaboration session.

In the method 100 at step 110, the system may alternatively detect that a user wishes to initiate a whiteboard session based on the content 224. The method 100 may initiate the call at step 140. FIG. 4 illustrates the GUI 210 of FIG. 2 with exemplary modifications by the new collaboration system after a user selection is received to initiate a whiteboard session in response to displayed content 220 of a collaboration event. As shown, the user has selected the whiteboard button 242 in the collaboration initiation box/window 230 in their GUI 210. In response, the system may modify or update the displayed GUI 210 to provide a popup box/window 460 to initiate a supplemental collaboration event/function in the form of a whiteboard session (with a single person or multiple people as participants). The box/window 460 may include a thumbnail or other presentation 470 of the selected content 224 and/or metadata (e.g., context produced by the system by processing the content 224). FIG. 1A shows that the whiteboard session is initiated at step 140 followed by step 142 involving creating metadata and/or taking a screenshot of the content 220, which may be cropped or otherwise processed to produce an image of the selected content 224 which may be displayed in whiteboard session GUI 460 as shown at 470 when the whiteboard session is launched at step 146 of method 100.

Additionally, in the method 100 at step 110, the system may detect that a user wishes to add a virtual note based on and relationally linked to the content 224. The method 100 may initiate the addition of a virtual or digital "sticky" note at step 150. In this case, the user will select data 224 and then select the virtual note button 238 shown in GUI 210. The method 100 will move from step 110 to step 150 and initiate addition of the virtual note. The method 100 continues at 151 with creating metadata (or sensible collaboration content) and then at 152 with the system modifying the GUI 210 to prompt the user to author a virtual or sticky note. The method 100 continues at 154 with the system taking a snapshot of the shared content 220 or more typically of the selected content 224 (in some cases, the snapshot is taken as part of creating the metadata in step 151). The sticky note that was authored is saved along with a thumbnail of content 220 and/or 224 in standard output. Then, at step 158, the system may act to display the virtual or sticky note and thumbnail of the content (e.g., in the GUI 210 to the user and/or to all or select ones of the other attendees during or after the ongoing collaboration session).

Additionally and similarly, in the method 100 at step 110, the system may detect that a user wishes to add a comment based on and relationally linked to the content 224. The method 100 may initiate the addition of a comment at step 160. In this case, the user will select data 224 and then select the new comment button 240 shown in GUI 210. The method 100 will move from step 110 to step 160 and initiate addition of the virtual note. The method 100 continues at 161 with creating metadata (or sensible collaboration content) and then at 162 with the system modifying the GUI 210 to prompt the user to author a comment related to the content 224. The method 100 continues at 164 with the system taking a snapshot of the shared content 220 or more typically of the selected content 224 (but, again, this may be performed as part of step 161 to assist in defining the metadata and sensible collaboration content). The authored comment is saved along with a thumbnail of content 220 and/or 224 in standard output. Then, at step 168, the system may act to display the new comment and thumbnail of the content (e.g., in the GUI 210 to the user and/or to all or select ones of the other attendees during or after the ongoing collaboration session).

Figure 5:
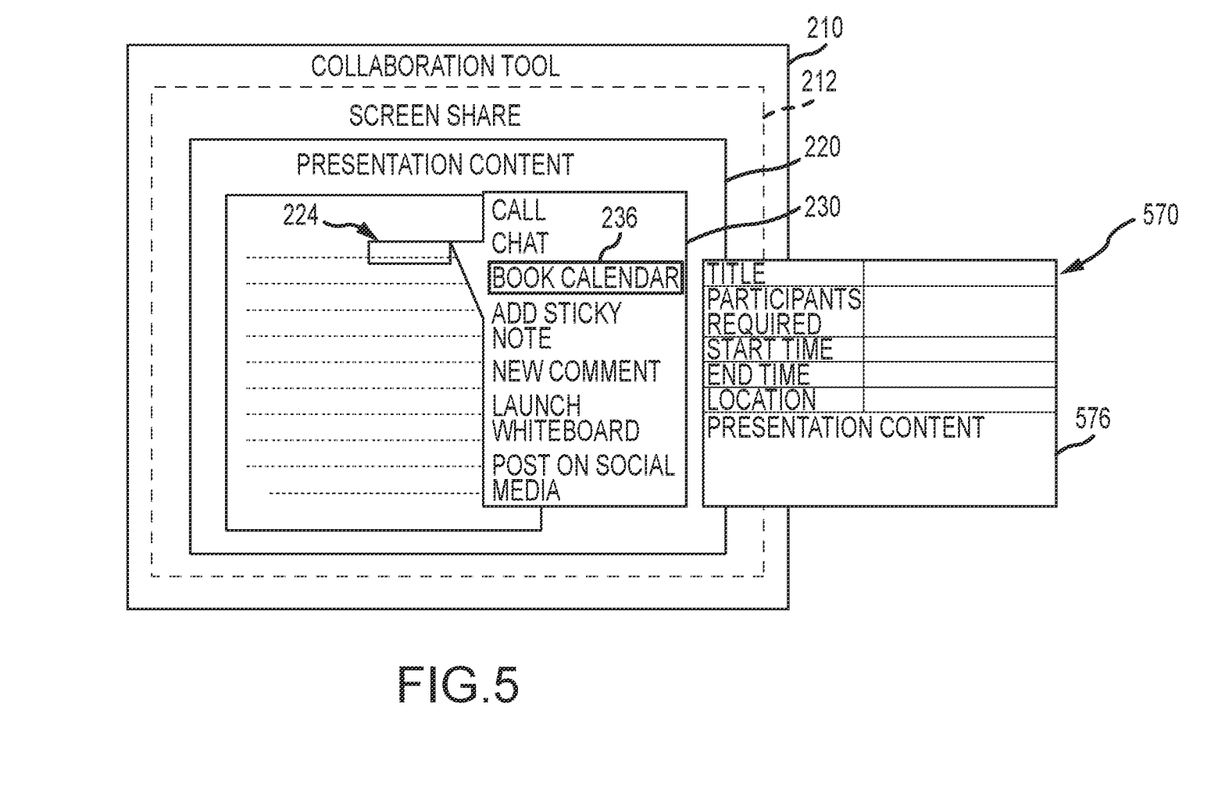
FIG. 5 illustrates the GUI of FIG. 2 with exemplary modifications after a user selection to initiate book a meeting (or other collaboration event) on digital calendars in response to displayed content of a collaboration session.

In the method 100 at step 110, the system may alternatively detect that a user wishes to book a meeting, call, or other supplemental collaboration event based on the content 224. The method 100 may initiate the calendar booking at step 170. FIG. 5 illustrates the GUI 210 of FIG. 2 with exemplary modifications by the new collaboration system after a user selection is received to book a new collaboration event/function on participants' calendars in response to displayed content 220 of a collaboration session. As shown, the user has selected the book calendar button 236 in the collaboration initiation box/window 230 in their GUI 210. In response, the system may modify or update the displayed GUI 210 to provide a popup box/window 570 to initiate booking on one or more digital calendars a supplemental collaboration event/function in any of a number of forms and with a single person or multiple people as participants/attendees, which may be initially determined by the system by processing the content 224 and data related to the ongoing session (e.g., listing of all participants of current session for editing by the user). The box/window 570 may include a thumbnail or other presentation 576 of the selected content 224 and/or metadata (e.g., context produced by the system by processing the content 224). FIG. 1B shows that the event booking is initiated at step 170 followed by: the system creating at step 172 metadata by processing the selected content 224; the system and user selecting participants in step 174 for the event to be calendared; and the system at step 176 sending invites for the new collaboration event along with the metadata (and, in some cases, a snapshot or thumbnail of the selected data 224), which will result in a booking of the new meeting/collaboration event on accepting invitees' calendars.

Figure 6:
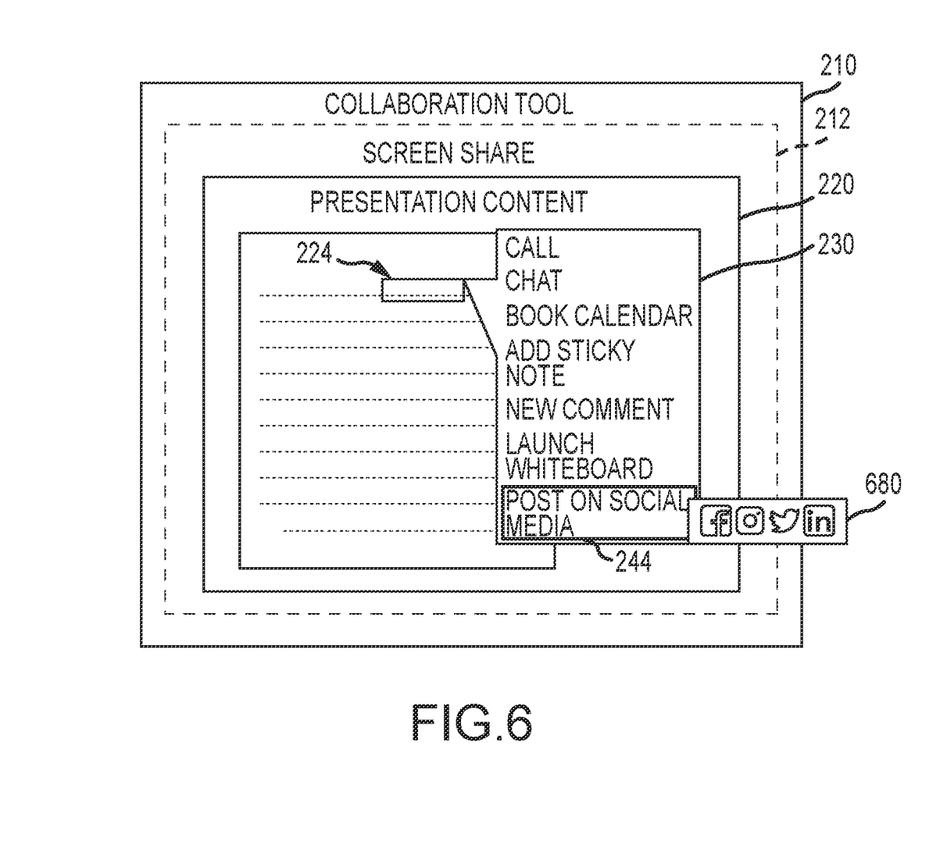
FIG. 6 illustrates the GUI of FIG. 2 with exemplary modifications after a user selection to initiate a social media posting in response to displayed content of a collaboration session.

Also, in the method 100 at step 110, the system may detect that a user wishes to post on social media based on the content 224 as a different form of a supplemental collaboration function or event. The method 100 may initiate the calendar booking at step 180. FIG. 6 illustrates the GUI 210 of FIG. 2 with exemplary modifications by the new collaboration system after a user selection is received to post on social media in response to displayed content 220 of a collaboration session. As shown, the user has selected the portion 224 of the content 220 and selected the post on social media button 244 in the collaboration initiation box/window 230 in their GUI 210. In response, the system may modify or update the displayed GUI 210 to provide a popup box/window 680 to initiate posting on a social media platform, with links to one or more such platforms being provided in the box/window 680. FIG. 1B shows that the social media posting is initiated at step 180 followed by: the system creating at step 182 metadata by processing the selected content 224; the system and user selecting a social media platform to utilize in this collaboration event/function in step 184; and the system at step 186 facilitating or initiating the posting the selected content (e.g., system-created metadate and, in some cases, a snapshot or thumbnail of the selected data 224), with, in some cases, a user note/comment provided in the posting related to the selected content 224.

Figure 7:
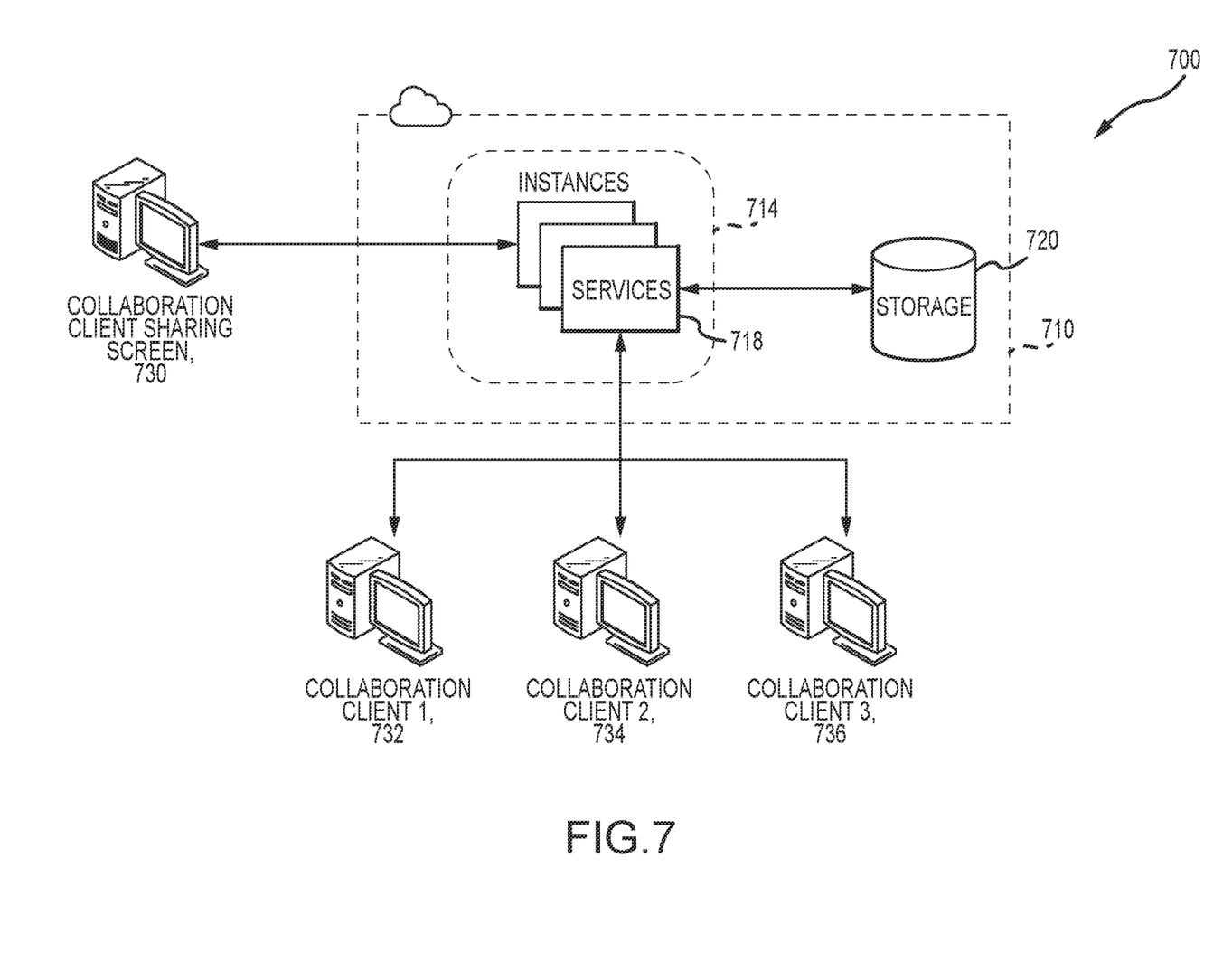
FIG. 7 illustrates a communication system adapted to provide the collaboration techniques or methods described in the present description.

The collaboration method 100 of FIGS. 1A and 1B may be implemented by the operation of an electronic communication system 700 as shown simplistically in FIG. 7. As shown, the system 700 includes a digital communication network (e.g., the Cloud) 710 upon which a plurality of instances 714 of services 718 are provided and communicatively coupled. These services 718 may include streaming services, collaboration application hosting services, and date storage services that together are useful for achieving online collaboration among a plurality of participants. Typically, the instances will be provided by software and/or code executed or run by one or more such processors of computing devices (e.g., servers) linked in the network 710. The system 700 also includes data storage 720 accessible by the services 718 for storing shared collaboration content and for storing data as useful for performing the collaboration functions described herein (e.g., for storing data as useful when performing the method 100 of FIGS. 1A and 1B).

Further, the system 700 includes a collaboration client device 730 (e.g., a computer or communication device) communicatively linked to the network 710 that is operated to act as a presenter in a collaboration session hosted or presented by one or more of the services 718. Particularly, the device 730 is operated by a presenter or user (not shown) to share content (e.g., share their screen) in a collaboration session. The system 700 also includes one-to-many client devices 732, 734, 736 (e.g., computer or communication devices) communicatively linked to the network 710, and each of these is operated by an attendee or participant of the collaboration session being hosted or presented by the one or more of the services 718. The collaboration clients 732, 734, and 736 are each configured, such as with a collaboration client application or plugin to communicate with a collaboration service 718 providing the new collaboration tools and functions described herein (e.g., to display content, to allow a user to interact with the displayed content, to respond to the interaction by identify a subset or selected portion of the displayed content, and to prompt and respond to initiation of a supplemental or new collaboration event based on the selected portion of content).

Figure 8:
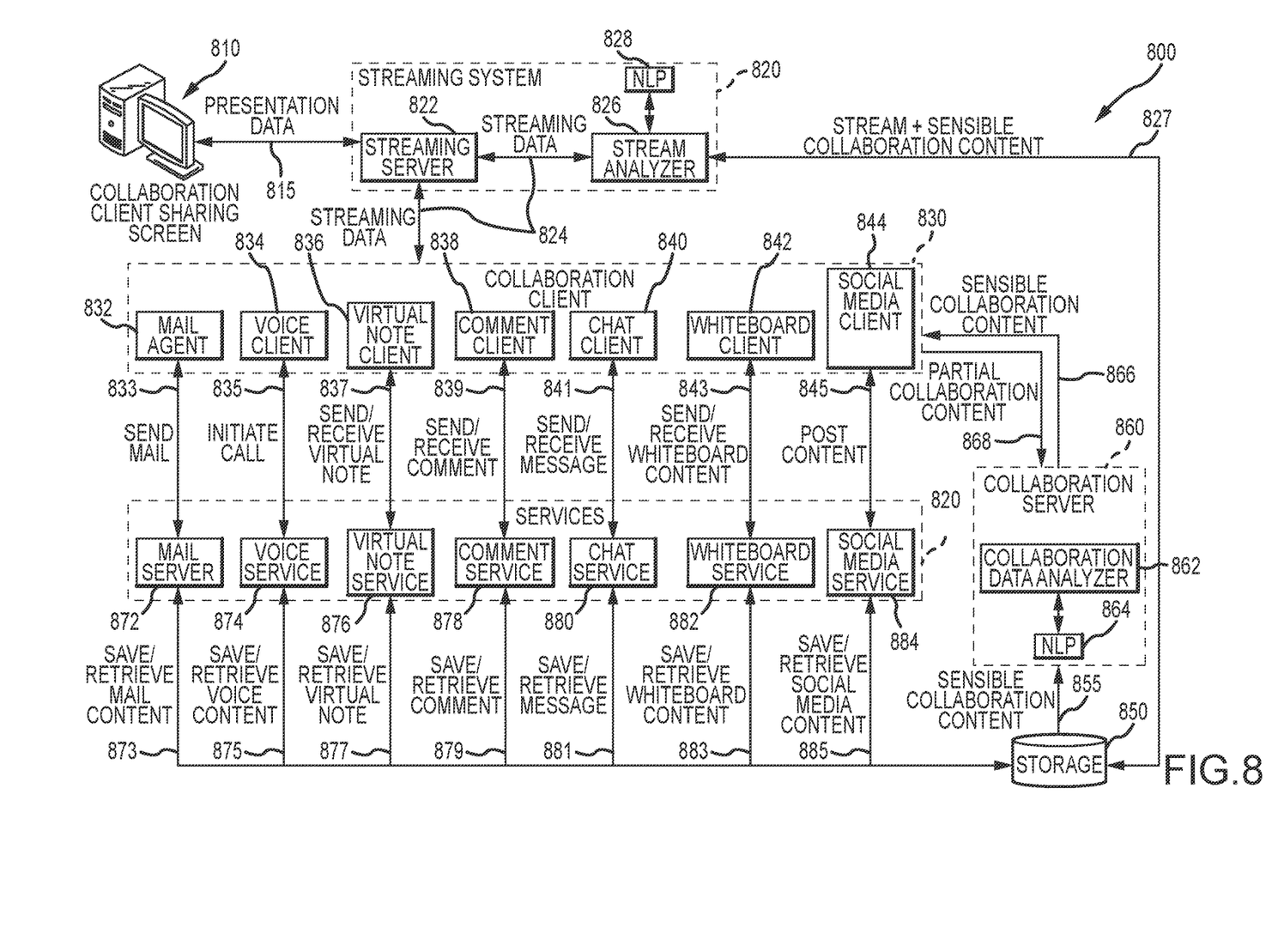
FIG. 8 illustrates a function block or schematic diagram for a communication or collaboration system implementing the collaboration techniques or methods of the present description such as by performing the collaboration method of FIGS. 1A and 1B.

To provide an expanded explanation of the exemplary system 700, FIG. 8 illustrates a function block or schematic diagram for a communication or collaboration system 800 implementing the collaboration techniques or methods of the present description such as by performing the collaboration method 100 of FIGS. 1A and 1B. The system 800 includes a collaboration client device 810 operating to share their content (i.e., to share content) during a collaboration session, which may be hosted in part by a streaming system 820 with a streaming server 822 and/or by operation of a collaboration server 860 configured with a collaboration data analyzer or COD engine 862 to provide at least a portion of the new collaboration functions described herein.

During a collaboration session, the client 810 is operated to share content and presentation data 815 that includes this content along with other data will be communicated to the streaming server 822 for communication with collaboration client device 830 (e.g., client devices 732, 734, 736 of FIG. 7) and with stream analyzer 826 as shown with arrows 824. The stream analyzer 826, which may call a NLP module 828, processes the streaming data 824 (which includes the presentation data 815) to generate stream and sensible collaboration content 827 that is communicated to data storage 850 for storage and for transmission (or access) as shown at 855 to the collaboration server 860. The collaboration server 860 uses a collaboration data analyzer 862, which may also call an NLP module 864, to process further the collaboration content, such as based on a selection of content as shown by arrow 860 to generate a subset of the content along with metadata and other context (such as a thumbnail, keywords, and the like) for providing to collaboration clients 830 as shown with arrow 866.

FIG. 8 also shows that the collaboration client 830 may run a set of client modules or applications to facilitate initiation of collaboration events/functions via communications with a set of services 870. These supplemental collaboration events/functions are shown with: (a) a mail agent 832 communicating with a mail server 872 to send e-mail 833 (which may involve the mail server 872 saving and retrieving mail content from storage 850 as shown with arrow 873); (b) a voice client 834 communicating with a voice service 874 to initiate a call 835 (which may involve the voice service 874 saving and retrieving voice content from storage 850 as shown with arrow 875); (c) a virtual note client 836 communicating with a virtual note service 876 to send/receive a virtual note 837 (which may involve the virtual note service 876 saving and retrieving a virtual note from storage 850 as shown with arrow 877); (d) a comment client 838 communicating with a comment service 878 to send/receive a comment 839 (which may involve the comment service 878 saving and retrieving a comment from storage 850 as shown with arrow 879); (e) a chat client 840 communicating with a chat service 880 to send/receive messages 841 (which may involve the chat service 880 saving and retrieving a message from the storage 850 as shown with arrow 881); (f) a whiteboard client 842 communicating with a whiteboard service 882 to send/receive whiteboard content 843 (which may involve the whiteboard service 882 saving and retrieving whiteboard content from the storage 850 as shown with arrow 883); and (g) a social media client 844 communicating with a social media service 884 to send/receive content for posting 845 (which may involve the social media service 884 saving and retrieving social media content from the storage 850 as shown with arrow 885).

As can be seen in FIG. 8, when a client 810 starts screen sharing in a collaboration session, the client 810 starts streaming 815 data to a streaming server 822. The streaming server 822 will utilize a stream analyzer 826 to figure out the content and its relevant toward collaboration, and the stream analyzer 826 may make use of the NLP module e828 to help it derive sensible collaboration content 827 along with the streaming data 824 that is stored in the database/storage 850 for future use. This is a continuous process that occurs in the backend of the collaboration system 800 and/or its operations.

When a collaboration client 830 is operated to initiate a collaboration event (e.g., send an e-mail via mail agent 832), the collaboration client 830 will send the current content to the collaboration server 860 as shown with arrow 868. The collaboration server 860 will use the collaboration data analyzer 862 to try to figure out the partial collaboration content 868, and the analyzer 862 may call upon the NLP module 864 to perform processing to derive sensible collaboration content. This sensible collaboration content is sent over to the database/storage 850 to retrieve matching collaboration content for a given time frame (a range of time relative to the point in time the user selected a portion of the displayed content), and the matching content is sent back to the collaboration client device 830.

The collaboration client application or plugin on the client device 830 will present the suggested collaboration content to the user based on the collaboration event being initiated. For example, if the user chose to add a virtual note, the collaboration content will be presented to the user in the form of a default virtual note whereas if the user chose to send an e-mail, the collaboration content will be presented in e-mail format. The user may be free to modify the content if the suggested content is not what they expected or desired. Based on the user action, appropriate collaboration services in the set 870 will be called to take appropriate action to facilitate or provide the new collaboration event or function based on the user-selected portion for the displayed content.

As used herein, the terms application, module, analyzer, engine, and the like can refer to computer program instructions, encoded on computer storage medium for execution by, or to control the operation of, data processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of the substrates and devices. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., solid-state memory that forms part of a device, disks, or other storage devices).

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. The features of the various embodiments may stand alone or be combined in any combination. Further, unless otherwise noted, various illustrated steps of a method can be performed sequentially or at the same time, and not necessarily be performed in the order illustrated. It will be recognized that changes and modifications may be made to the exemplary embodiments without departing from the scope of the present invention. These and other changes or modifications are intended to be included within the scope of the present invention, as expressed in the following claims.

As a final overview of the concepts described herein, the proposed collaboration method allows the user to create a collaboration opportunity (such as with the above conference call examples) by not only activating the collaboration tool taught herein to spawn a new collaboration event but also by eliciting important context from the presented content or media. Context can be derived using NLP or other techniques and creating metadata elements (e.g., "Meeting Purpose," keywords, participants, and the like). In some cases, collaboration tools or functions are provided that process this derived context to produce a thumbnail image (such as via web search) in the spawned chat session, pushed social media, or other newly created collaboration event.

In another scenario using the proposed collaboration method, a collaboration user can isolate and/or highlight a portion of the presented content during its presentation in a parent collaboration session and then choose to "Create a Virtual Note" (or add a sticky note). The user is provided with the capability (by the new communication system) to compose notes in a modified view (SW interface or GUI graphically is created to present a note on top of a snapshot of the presented media, as one example). The new collaboration principle is applied by being able to collaborate using the virtual notes medium, where the note itself then becomes a field of interaction that is based on the presented content (which was highlighted or selected by the user).

As discussed above, users may use the communication system to join a meeting or other collaboration session via a collaboration application using their online or networked client device. One of the attendees/users may want to get a document seen by all so they share their screen and then start to present their content. Other attendees want additional discussion regarding a portion of the displayed or shared content (media being presented online in the parent session), perhaps not wanting to interrupt the meeting/session that is currently underway. Therefore, the attendee/user operates their client device running or accessing the collaboration tools of the present description to choose a collaboration initiation option, such as "Create a Conference Call," while right-clicking their mouse on (or otherwise selecting) highlighted content. Attendees are added by the collaboration tools to an ad hoc conference call (or other selected collaboration event) and the content that was highlighted (or a portion in the vicinity of a cursor/pointer location when the new event is triggered) as the topic of conversation from the parent session's displayed content is displayed in the conferencing apparatus (e.g., in each attendee's client device).

Presentation content (e.g., a subset of the displayed content identified by the user/attendee) acts as the source or "stimulus" for one of the following stimulus-based collaboration sequences that are initiated and executed: (a) initiating a voice call/conference call; (b) initiating a chat session; (c) creating a calendar booking; (d) creating a virtual note (also labeled or thought of as a digital sticky note); (e) initiating a whiteboard session; and (f) creating a social media function (e.g., a post, a message, and so on). Once the communication system with its new collaboration tools/components/modules detects the source of the media where a collaboration event initiation request is made, the communication system with its software-based tools makes a few decisions to properly take into account the content so as to enhance the spawned collaboration experience or event.

For example, if during a video conference meeting, a user initiates a whiteboard session, the system takes into account the most relevant video so that the whiteboard session is not disconnected. An interface may be automatically generated in the new system that shows a highlight reel of the video conference at a predefined range of time when the new event is initiated or at or near an associated timestamp. The new whiteboard session then is configured to allow each invited collaborator to contribute based on this or other user-selected content from the parent session. It may be the source of inspiration (brainstorming), in which case, the reason for the new event or session is more in focus because the system can analyze the video selected and produce keywords automatically in some embodiments. A whiteboard session that is announced with collaborators notified is more effective as the keywords and/or a transcript of the video are simultaneously shared with the attendees of the spawned collaboration event. For each online meeting, video conference, or other collaboration session or source, the new communication system may include a subprocess to produce useful context so that the collaborators can collaborate using generated context associated with the selected portion of the displayed content such as generated keywords, topics, snapshots, and the like.

In some of the examples above (e.g., FIGS. 1A and 1B, which are exemplary and not required ways of implementing the invention), steps of creating metadata (or performing analysis of presented content) and taking a snapshot were discussed. The snapshot capture/collection is not the same as in the analysis step (but may be used as part of performing that step). Furnishing the recipient of a stimulus-based action (e.g., place a phone call) is more than just the topic of the presented content, as it is about, in some implementations, supplying a relevant thumbnail-image taken from the presentation as key context. In one operating mode, a person may be receiving a phone call from someone who is in a meeting applying the techniques taught herein, with the subject of the call is transmitted in a keyword (e.g., "Project Risks"), and an image of some presented points/bullets that were the basis of the presentation topic, hence the purpose of the call, are provided.

We claim:

1. An electronic communication system with stimulus-based collaborative functions and configured to generate a collaborative event related to an ongoing presentation, the electronic communication system comprising:

a collaboration server communicatively linked to a digital communications network, wherein the digital communications network is configured to host an ongoing presentation and provide information for the ongoing presentation;

the collaboration server configured to display a graphical user interface (GUI) collaboration icon on a user device;

a data storage accessible via the digital communications network, wherein the data storage is configured to store collaboration content for a collaboration event, wherein the collaboration content comprises presented content shared during the ongoing presentation; and a collaboration data analyzer running on the collaboration server, wherein the collaboration data analyzer is configured to process the presented content of the ongoing presentation and a user utilizes the user device to identify or highlight during the ongoing presentation a portion of the presented content for use in a collaboration event; and the collaboration server is further configured to communicate with the user device and send, based on instructions from the user device, a calendar invitation for the collaboration event during the ongoing presentation, wherein the calendar invitation (a) includes the portion of the presented content of the ongoing presentation identified or highlighted by the user, (b) the collaboration event is a new presentation different from the ongoing presentation, and is scheduled to occur after the ongoing presentation, and (c) is based solely subject matter presented in the ongoing presentation, and (d) the calendar invitation is sent to (i) a subset of participants of the ongoing presentation, and (ii) one or more persons who are not participants in the ongoing presentation;

wherein the collaboration data analyzer (i) calls a Natural Language Processing (NLP) module to process the portion of the presented content to determine keywords to include in the calendar invitation, and (ii) processes streaming data associated with the ongoing presentation to identify metadata and wherein the metadata is used to provide the collaboration event.

2. The electronic communication system of claim 1, wherein the collaboration data analyzer determines the portion of the presented content based on a location of the user device on a display screen displaying the presented content of the ongoing presentation.

3. The electronic communication system of claim 2, wherein the portion of the presented content is determined based on a predefined area or a user-definable area about the location of the user device on the display screen.

4. The electronic communication system of claim 2, wherein the presented content comprises video or audio content and wherein the portion of the presented content includes a recorded segment of the video or audio content from a time range in the ongoing presentation including a time corresponding to a time the user selected the portion of the presented content.

5. The electronic communication system of claim 1, wherein the portion of the presented content is stored in the data storage.

6. The electronic communication system of claim 1, wherein the collaboration server is configured to create a thumbnail image of the portion of the presented content for use in the collaboration event and wherein the collaboration server provides the thumbnail image in the calendar invitation for the collaboration event.

7. The electronic communication system of claim 1, wherein the portion of the presented content is one or more of speech, text, images, and video.

8. The electronic communication system of claim 1, wherein the collaboration server is further configured to permit the user to modify the portion of the presented content.

9. The electronic communication system of claim 1, wherein the collaboration data analyzer processes the presented content to determine the context.

10. The electronic communication system of claim 1, wherein the portion of the presented content includes metadata from one or more of spoken words, text, images, faces, and objects, and the metadata populates the calendar invitation with one or more of: (a) a collaboration event purpose, (b) a collaboration event suggested agenda, (c) collaboration event participants, and (d) collaboration event keywords.

11. A method of stimulus-based collaboration-event generation in a communication system, the method comprising:

during an ongoing online presentation, utilizing a content monitor, analyzing streaming data of presented content associated with the ongoing online presentation to identify text and images to generate metadata, and to generate thumbnails;

a user, via a user device, activating a GUI collaboration event icon that is generated on a screen of the user device by a collaboration server, wherein the user device is utilized by the user to identify or highlight during the ongoing online presentation a portion of the content of the ongoing online presentation for the collaboration event, and the identified or highlighted portion of the content is included in a calendar invitation for the collaboration event; and wherein the collaboration event is a new presentation different from the ongoing online presentation, is scheduled to occur after the ongoing online presentation, and is based solely on subject matter presented in the ongoing online presentation, and the calendar invitation is sent by the user device via the collaboration server during the ongoing online presentation to collaboration event participants comprising (a) a subset of attendees of the ongoing online presentation, and (b) one or more selected non-attendees of the ongoing online presentation, and wherein the at least some of the presented content in the calendar invitation is part or all of the text, the images, the metadata, and the thumbnails of the ongoing online presentation; and calling, using a collaboration data analyzer of the communication system, a Natural Language Processing (NLP) module to process the portion of the presented content to determine keywords to include in the calendar invitation event.

12. The method of claim 11 that further includes the step of detecting user interaction with a subset of the streaming data displayed by the user device, wherein the user interaction includes operation of the user device to select a portion of the subset of the streaming data being displayed at a particular time during the ongoing online presentation and wherein the at least part or all of the text, the images, the metadata, and the thumbnails corresponds with the portion of the subset of the streaming data being displayed.

13. The method of claim 11, wherein the text is processed using the NLP module to determine keywords or topics for the collaboration event and a collaboration server populates the calendar invitation with the keywords or topics.

14. The method of claim 11, wherein the calendar invitation further includes a purpose of the collaboration event.

15. The method of claim 11, wherein the portion of the presented content includes metadata from one or more of spoken words, text, images, faces, and objects, and the metadata populates the calendar invitation with one or more of: (a) a collaboration event purpose, (b) a collaboration event suggested agenda, (c) collaboration event participants, and (d) collaboration event keywords.

16. The method of claim 11, further comprising: processing streaming data associated with the ongoing online presentation to identify metadata used to provide the collaboration event.

17. A method of booking a stimulus-based collaboration event in a communication system, the method comprising:

during an ongoing online presentation, storing online presentation content being streamed to user devices of attendees of the ongoing online presentation wherein the online presentation comprises presented content shared during the ongoing online presentation;

during the ongoing online presentation, processing, by a collaboration data analyzer, the presented content of the ongoing presentation to identify or highlight during the ongoing presentation a portion of the presented content for use in a collaboration event;

during the ongoing online presentation, receiving from one of a plurality of user devices user input to (a) send a calendar invitation to (i) a subset of the other attendees of the online presentation, and (ii) one or more non-attendees of the online presentation, for a new future collaboration event that is a different presentation from the ongoing online presentation and that is scheduled to occur after the ongoing online presentation, and that is based solely subject matter presented in the ongoing online presentation, and (b) the one of the user devices highlighting or selecting during the ongoing online presentation a portion of the ongoing online presentation content being displayed and including the portion of the ongoing online presentation content in the calendar invitation; and calling, using a Natural Language Processing (NLP) module of the collaboration data analyzer, to process the portion of the presented content to determine keywords to include in the calendar invitation; and processing, using the NLP module, streaming data associated with the ongoing online presentation to identify metadata to provide the collaboration event.

18. The method of claim 17, wherein the user input identifying the portion of the online presentation content is a location of a cursor on a display screen and a timestamp during the online presentation and wherein the collaboration event calendar invitation includes content in an area of the display screen about the location or media presented within a range of time including the timestamp.

19. The method of booking a stimulus-based collaboration event of claim 17, wherein the portion of the presented content includes metadata from one or more of spoken words, text, images, faces, and objects, and the metadata populates the calendar invitation with one or more of: (a) a collaboration event purpose, (b) a collaboration event suggested agenda, (c) collaboration event participants, and (d) collaboration event keywords.

20. The method of booking a stimulus-based collaboration event of claim 17, further comprising: processing streaming data associated with the ongoing online presentation to identify metadata used to provide the collaboration event.

* * * * *